(12) United States Patent
Chuklanov et al.

(10) Patent No.: US 11,356,585 B1
(45) Date of Patent: Jun. 7, 2022

(54) SYSTEM AND METHOD FOR OPTICAL ALIGNMENT AND CALIBRATION OF AN INFRARED CAMERA LENS

(71) Applicant: Adasky, Ltd., Yokneam Illit (IL)

(72) Inventors: Michael Chuklanov, Kiryat Motzkin (IL); Vitaly Kuperman, Maalot (IL); Nir Brandwine, Shorashim (IL)

(73) Assignee: Adasky, Ltd., Yokneam Illit (IL)

( * ) Notice: Subject to any disclaimer, the term of this patent is extended or adjusted under 35 U.S.C. 154(b) by 0 days.

(21) Appl. No.: 17/154,695

(22) Filed: Jan. 21, 2021

Related U.S. Application Data

(63) Continuation-in-part of application No. 16/699,894, filed on Dec. 2, 2019, now Pat. No. 11,025,807.

(51) Int. Cl.
*H04N 5/225* (2006.01)

(52) U.S. Cl.
CPC .............................. *H04N 5/2254* (2013.01)

(58) Field of Classification Search
CPC ...... H04N 5/2254; H04N 5/2257; H04N 5/33; H04N 5/332; H04N 2201/0464; H05B 47/195
See application file for complete search history.

(56) References Cited

U.S. PATENT DOCUMENTS

| | | |
|---|---|---|
| 8,542,451 B2 | 9/2013 | Lu et al. |
| 9,277,104 B2 | 3/2016 | Sesti et al. |
| 9,338,334 B2 | 5/2016 | Lu et al. |
| 2007/0279619 A1 | 12/2007 | Chang |
| 2010/0010504 A1 | 1/2010 | Simaan et al. |
| 2010/0103308 A1* | 4/2010 | Butterfield ........ H01L 27/14685 348/340 |
| 2012/0019940 A1 | 1/2012 | Lu et al. |
| 2012/0219257 A1 | 8/2012 | Meadowcroft et al. |
| 2014/0298642 A1 | 10/2014 | Sesti et al. |
| 2015/0256726 A1* | 9/2015 | Kaioka ..................... G02B 7/02 348/360 |
| 2016/0367208 A1* | 12/2016 | Liu ...................... A61B 5/0059 |
| 2018/0361590 A1 | 12/2018 | Ting et al. |

(Continued)

FOREIGN PATENT DOCUMENTS

| | | |
|---|---|---|
| JP | 2010134377 A | 6/2010 |
| JP | 2016092761 A | 5/2016 |
| WO | 2017139825 A1 | 8/2017 |

OTHER PUBLICATIONS

International Search Report and Written Opinion of International Searching Authority for PCT/IB2020/061329, Isa/IL, Jerusalem, Israel, dated: Feb. 17, 2021.

(Continued)

*Primary Examiner* — Yogesh K Aggarwal
(74) *Attorney, Agent, or Firm* — M&B IP Analysts, LLC (57) ABSTRACT

A system for optical alignment and calibration of an infrared camera lens, including: a lens support mechanism configured to adjust a position of an infrared camera lens relative to a camera body; at least one collimator configured to output infrared rays, wherein the at least one collimator is positioned such that the output infrared rays converge on an infrared sensor within the camera body through the infrared camera lens; and at least one curing catalyst configured to cure an adhesive placed on the infrared camera lens when an ideal lens position is determined.

19 Claims, 5 Drawing Sheets

(56) References Cited

U.S. PATENT DOCUMENTS

2019/0052779 A1* 2/2019 Taylor ................. H04N 5/2253
2019/0336093 A1  11/2019 Parrini et al.
2020/0024853 A1* 1/2020 Furrer ................. B25J 15/0019
2021/0168266 A1  6/2021 Kuperman et al.

OTHER PUBLICATIONS

International Search Report and Written Opinion of International Searching Authority for PCT/IB2021/057382, Isa/IL, Jerusalem, Israel dated: Oct. 28, 2021.

* cited by examiner

SYSTEM AND METHOD FOR OPTICAL ALIGNMENT AND CALIBRATION OF AN INFRARED CAMERA LENS

CROSS REFERENCE TO RELATED APPLICATIONS

This application is a continuation-in-part of U.S. application Ser. No. 16/699,894 filed on Dec. 2, 2019, the contents of which are hereby incorporated by reference.

TECHNICAL FIELD

The present disclosure relates generally to camera lens calibration, and more specifically to the initial alignment and calibration of infrared camera lenses.

BACKGROUND

As sensor-based technology has improved dramatically in recent years, new uses for sensors have become possible. In particular, cameras have become widely utilized for various applications, including advanced driver assistance systems (ADAS) and autonomous vehicle systems. One type of camera that may be utilized in these applications is a thermal infrared camera. The infrared spectrum lies outside of the visible light range and consists of a near infrared section (NIR) with wavelengths of 0.75-1 micrometers ($\mu m$); a short wavelength infrared section (SWIR) with wavelengths of 1-3 $\mu m$; a medium wavelength infrared section (MWIR) with wavelengths of 3-5 $\mu m$; and a long wavelength infrared section (LWIR) with wavelengths of 8-14 $\mu m$. Many thermal infrared (IR) cameras operate within the LWIR section to detect infrared energy that is guided to an IR sensor through the camera's lens. These IR cameras can be utilized for a variety of imaging applications including, but not limited to, passive motion detection, night vision, thermal mapping, health care, building inspection, surveillance, ADAS, and the like.

During the manufacture of an infrared camera, a lens should be attached to the camera body, namely the element of the camera housing an infrared image sensor. This attachment should be performed to exacting standards, as the lens must not only be placed at an ideal distance from the sensor, but in an ideal plane, since any minor shift or skewed positioning will result in subpar or out of focus images. Therefore, the lens should be secured to the camera body with optimal positioning along the six degrees of freedom. Attaching a lens in such a precise manner manually is not only ineffective, but difficult to replicate on a consistent basis, let alone accomplish in an efficient manner. Further, even though robotic arms may be used to execute the attachment and reliably repeat the same movements from camera to camera, each lens and sensor may vary ever so slightly, requiring a unique and individualized attachment for each pairing of a sensor and a lens, proving a difficult task for a generic robot.

It would therefore be advantageous to provide a solution that would overcome the challenges noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "certain embodiments" may be used herein to refer to a single embodiment or multiple embodiments of the disclosure.

Certain embodiments disclosed herein include a system for optical alignment and calibration of an infrared camera lens, including: a lens support mechanism configured to adjust a position of the infrared camera lens relative to a camera body; at least one collimator configured to output infrared rays, wherein the at least one collimator is positioned such that the output infrared rays converge on an infrared sensor within the camera body through the infrared camera lens; and a curing catalyst applier configured to apply a catalyst to cure an adhesive placed on the infrared camera lens; wherein the lens support mechanism is configured to initially adjust the position of the infrared camera lens until the infrared camera lens is positioned, using the output infrared rays, at an ideal lens position with respect to the infrared sensor; wherein the lens support mechanism is configured to adjust the position of the infrared camera lens after the infrared camera lens is positioned at an ideal lens position with respect to the infrared sensor to a new, offset position, the new, offset position of the infrared camera lens being based on the ideal lens position and expected shrinkage of the adhesive during curing; and wherein the curing catalyst applier applies the curing catalyst to cure the adhesive after the infrared camera lens is positioned at the new, offset position.

Certain embodiments disclosed herein also include a method for optical alignment and calibration of an infrared camera lens, including: applying an adhesive to an infrared camera lens, wherein the adhesive is configured to be cured by a curing catalyst; placing the infrared camera lens on a camera body using an adjustable arm; positioning the infrared camera lens at an ideal lens position using at least a calibration target and a modulation transfer function (MTF) chart associated thereto; moving the infrared camera lens to a new, offset position, the new, offset position of the infrared camera lens being determined based on the determined ideal lens position and expected shrinkage of the adhesive during curing; and curing the adhesive with the curing catalyst so as to fix the infrared camera lens in place, wherein the infrared camera lens moves from the new, offset position.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

Figure 1:
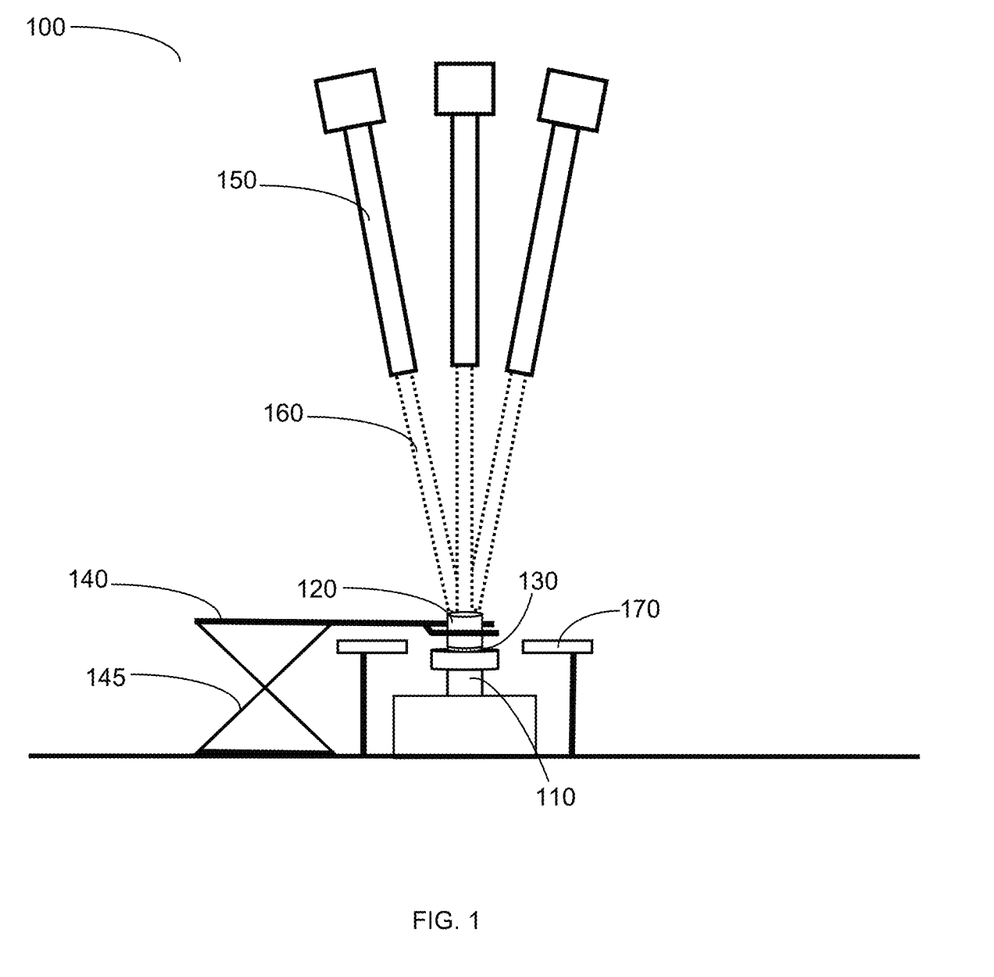
FIG. 1 is a schematic diagram of a system for optical alignment and calibration of an infrared camera lens according to an embodiment.

FIG. 1 is a schematic diagram of a system 100 for optical alignment and calibration of an infrared camera lens 120 according to an embodiment. The system 100 includes one or more collimators 150 placed directly above a lens 120, such as an infrared lens, to be used for lens calibration. A lens support mechanism of the system 100 includes a robotic arm 140 configured to hold the lens 120 and manipulate its position relative to a camera body 110. In an embodiment, the robotic arm 140 is supported by a hexapod platform 145. In an example embodiment, the platform 145 is configured to move the robotic arm 140, and the lens attached thereto 120, in a predefined number (e.g., 6) degrees of freedom. In a further embodiment, the hexapod platform 145 is a Steward platform with a high-resolution kinematic system employing three pairs of hydraulic, pneumatic, or electro-mechanical actuators configured to adjust the x, y, and z axes along with the pitch, roll, and yaw. This allows for precise adjustments to the positioning of the robotic arm 140 attached thereto and thus to the lens 120. In an embodiment, the hexapod is controlled by software, or hardware configured to run such software, that is configured to adjust the hexapod according to readings from the collimators 150, as discussed further below.

The software is stored in a machine-readable media and shall be construed broadly to mean any type of instructions, whether referred to as software, firmware, middleware, microcode, hardware description language, or otherwise. Instructions may include code (e.g., in source code format, binary code format, executable code format, or any other suitable format of code).

The collimators 150 are optical instrument including a well corrected objective lens with an illuminated calibration target at its focal plane. The emerging beam is a parallel, or collimated, beam, so that the image of the calibration target is projected at infinity. In an embodiment, there are five collimators 150 positioned above the lens 120 and the camera body 110 and are configured to output a calibration target projection. The collimators 150 are positioned such that the output calibration target projection converges on the infrared sensor within the camera body 110, through the lens 120. The angled arrangement of the collimators is designed to define the whole area of image sensor according to the camera's apparent field of view (FOV). In an embodiment, a shutter mechanism (not shown) is placed between the lens 120 and the collimators 150, such that the shutter can be opened and closed as the position of the lens 120 is adjusted, to provide an efficient manner of calibrating the lens between various positions.

Each collimator 150 includes three main parts: a black body, a target, and a collimating lens system. The parts of the collimator 150 are disposed within a structure of the collimator and are not shown in FIG. 1. In an embodiment, the black body is an electrically controlled device that is used as a highly stable background radiation source for the target. In an embodiment, it provides a difference of 10 degrees relative to a room ambient temperature. The camera sensor is positioned toward the black body, such that when the lens 120 is in place, the image produced by the sensor contains calibration target with a background of the black body. When in a properly calibrated position, the projection of the calibration targets converge on the infrared sensor of the camera 110 such that when the lens 120 is in place, the MTF values are optimized for all of the calibration targets. The system 100 may include multiple black bodies positioned within the FOV of the sensor used as calibration targets for the lens. The calibration targets are further discussed below.

In an embodiment, one or more ultraviolet (UV) light sources 170 are places around the lens 120 and the camera body 110. An adhesive can be used to secure the lens 120 to the camera body 110, where the adhesive is only cured when exposed to UV light. Thus, the position of the lens 120 can be freely adjusted until an ideal position is determined, as discusses herein below, at which point the UV light sources 170 are used to cure the adhesive and fix the lens in place. In one embodiment the adhesive may be Dymax® 6-621GEL UV adhesive. In a further embodiment, alternative curing mechanism are used instead of a UV curing mechanism, such as visible light curing, temperature-based curing, chemical curing, and so on.

Figure 2A:
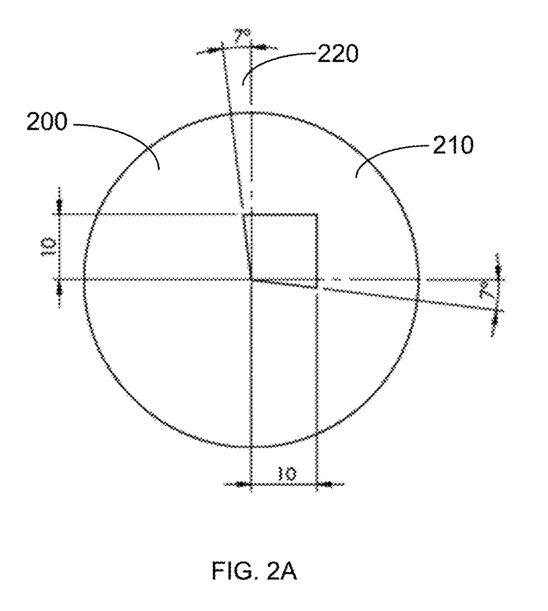
FIG. 2A is a schematic diagram of a calibration target according to an embodiment.

FIG. 2A is a schematic diagram of a calibration target 200 according to an embodiment. The target may include a black body designed to provide a temperature difference as a reference of thermal radiation, and reveal a portion of the black body arranged in a certain pattern that can be recorded by the detector and analyzed by the image processing software. In an embodiment, an example pattern includes the calibration target 200 with a circular shape and a portion of the circular shape exposed to reveal a black body. For example, a wedge 210 having a specific angle, e.g., an angle of 104 degrees (90 degrees of a quarter circle, with an additional 7 degrees 220 extending outward from each axis of the wedge) is shown. In an embodiment, the size of the wedges 210, e.g., the angle of the wedge, is adjustable, which allows for the control of the pattern appearance, and supports a variety of different patterns to support various application needs. The straight edges, set angle, and curved outer perimeter of the wedge shape provides different useful reference points to assist in determining sharp focus and calibration of the lens. Having 5 calibration targets 200 placed at defined parts of the FOV of the lens allows for greater optimization of the lens position.

Figure 2B:
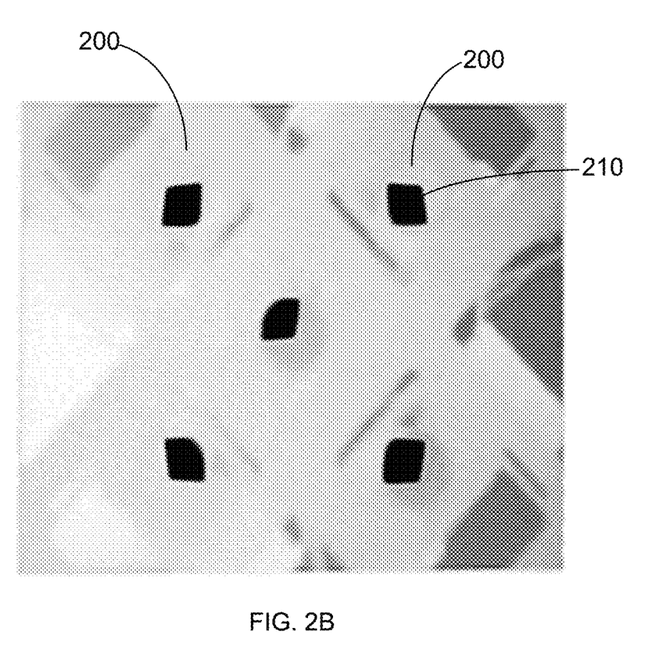
FIG. 2B is an example screenshot of a multiple calibration targets as see through a calibration system.

FIG. 2B is an example screenshot of multiple calibration targets 200 as see through a calibration system. The calibration targets 200 are positioned to maximize coverage of an FOV of the image sensor. In an embodiment, five calibration targets 200 are used, where one target is placed toward each corner and one target is placed in the center of the frame. The calibration targets 200 are visible through a collimator, e.g., the collimator 150 of FIG. 1. Namely, the five collimators may each contain one calibration target 200 and are positioned to fill the FOV of the image sensor.

Figure 3:
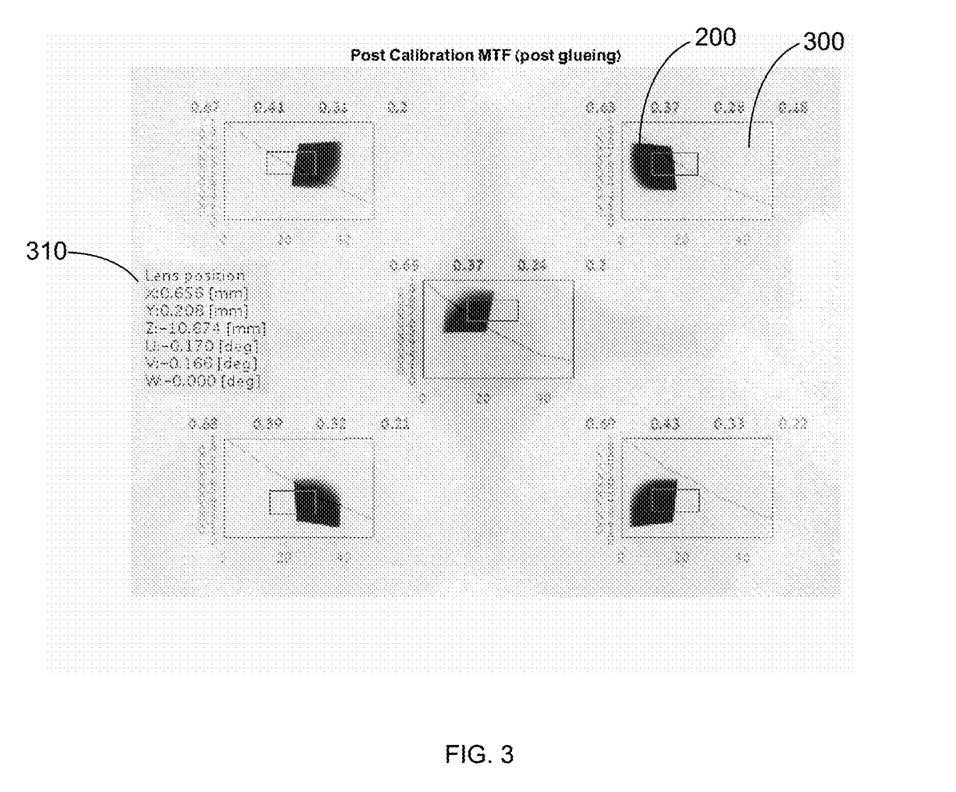
FIG. 3 is an example screenshot of multiple modulation transfer function (MTF) charts projected onto an image of the calibration targets after calibration has been completed.

FIG. 3 is an example screenshot of multiple modulation transfer function (MTF) charts 300 projected onto an image of the calibration targets. An MTF is a tool used to measure the imaging quality, including the contrast and the resolution of an optical device. The MTF graph displays the contrast as a function of spatial frequency. In an embodiment, the middle of the image sensor detects higher MTFs compared to the extremities of the sensor. In the disclosed embodiment, each section of the frame that contains a calibration target 200 is provided with an MTF chart 300. The positioning of the lens is adjusted, e.g., by controlling the hexapod 145 and robotic 140 holding the lens 120 of FIG. 1, until each of the MTF charts 300 is optimized. In an embodiment, software is used to analyze the local MTF responses in test images from the target to provide feedback for controlling the hexapod 145 in order to adjust the lens 120 position.

The calibration process includes a converging routine that uses the MTF chart 300 data as a metric in the determination for an optimal position for the lens. In an embodiment, the converging routine takes into consideration the measurements from five targets: one in the middle and one at each of the four corners of an image. In the shown example, the converging routine determines at optimal position where for spatial frequency of 50, the received MTF values is approximately 0.2 for each of the MTF charts 300.

In an embodiment, the exact lens positioning 310, e.g., measuring in millimeters and degrees from a point of reference, is determined and saved for future reference.

Figure 4:
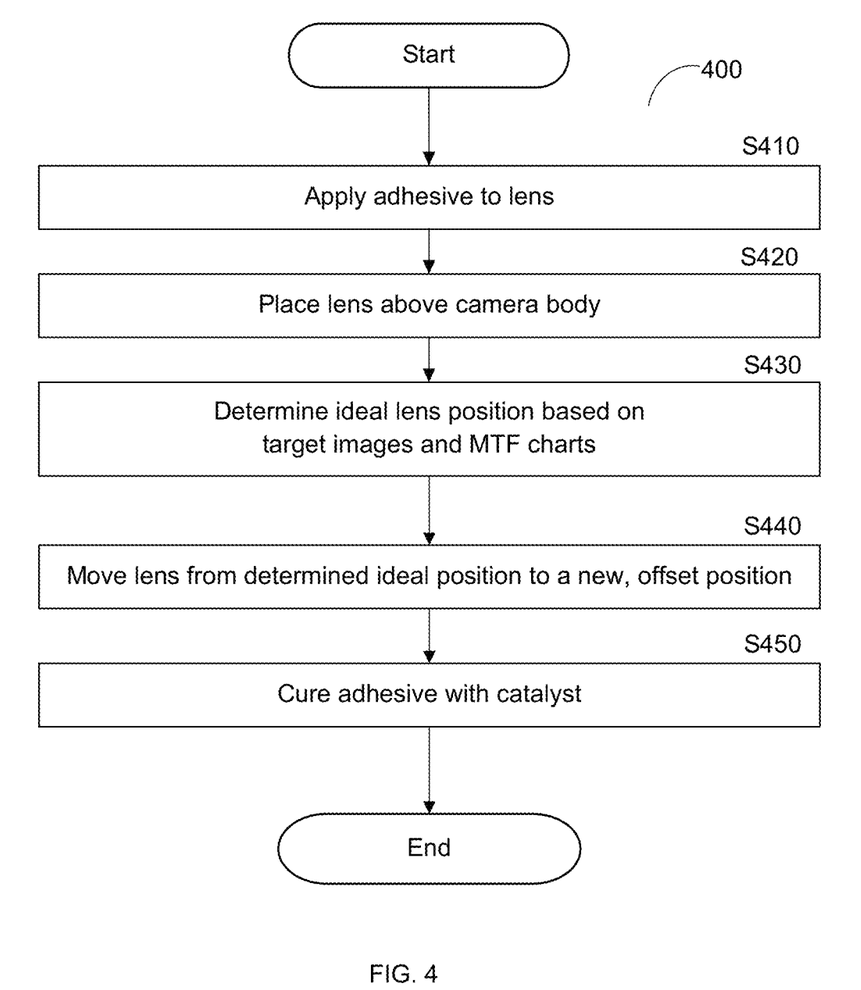
FIG. 4 is an example flowchart illustrating a method for attaching and aligning an infrared camera lens according an embodiment.

FIG. 4 is an example flowchart 400 illustrating a method for attaching and aligning an infrared camera lens according an embodiment.

At S410, an adhesive is applied to a lens configured for an infrared camera. The adhesive is formulated to be set and cured when exposed to a curing catalyst, such as an ultraviolet (UV) light, a temperature change, a chemical reaction, laser light, and so on. In an embodiment, the lens is handled with a robotic arm, such that the adhesive is applied to the circumference of the lens.

At S420, the lens, with the applied adhesive, is placed above the camera body while still being held, e.g., by the robotic arm. Thus, the positioning of the lens can still be adjusted by the robotic arm or a hexapod attached thereto, while the adhesive has not yet been cured.

At S430, the ideal lens position is determined based on calibration target images and MTF charts associated with those targets, as discussed above in FIG. 3. The position of the lens is adjusted based on feedback from an MTF chart, such that the resolution and contrast of the image from the camera upon which the lens is placed is maximized in all image regions, e.g., in the four corner regions and a center region with one region assigned to one calibration target. In an embodiment, if all of the MTF charts associated with each calibration target images cannot be maximized in a single position, the position that produced the best resolution and contrast uniformly among all the calibration target images is used. At the end of S430 the lens the lens is in its ideal lens position.

At S440, the position of the lens is moved from its ideal lens position the determined ideal position to a new position that is offset from the ideal lens position. The new, offset position is one that is determined to compensate for adhesive shrinkage. Put another way, since the adhesive shrinks as it is being cured, had the lens been left at its determine ideal position when the curing process is begun, the lens would move away from the ideal position by virtue of being pulled by the adhesive as the adhesive shrinks while it cures. To compensate for such shrinkage, the lens is moved, prior to curing to a position that compensates for such shrinkage, such that at the end of the curing process it is expected that the lens will end up back at its determined ideal position.

The offset position, which is a function of the properties of the particular adhesive employed, is determinable empirically or experimentally in a manner well known to those of ordinary skill in the art. Thus, the offset position is based to which the lens is moved is based on the ideal lens position and the properties of the particular adhesive employed. Advantageously, instead of the lens being moved to a final position from its determined ideal lens position by shrinkage of the glue during curing, and so being improperly located, the final position of the lens after curing is substantially the determined ideal location because the lens was moved to the new, offset position prior to being cured.

At S450, the adhesive is cured and the lens is fixed in place. In an embodiment, curing is accomplished by exposing the adhesive to intense UV light from multiple directions in order to ensure uniform curing. In one embodiment, the adhesive is cured by exposure to UV light for 30 seconds from 4 UV LED sources positioned equally around. In a further embodiment, curing is accomplished by alternative catalysts, such as a visible light source, a temperature change, a chemical reaction, laser light, and so on.

Figure 5:
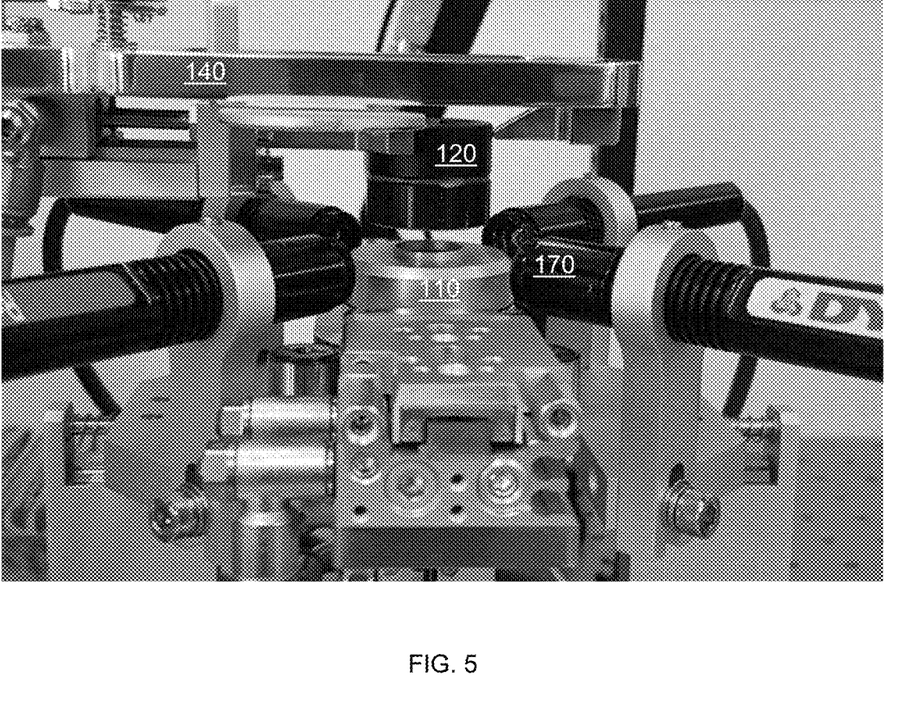
FIG. 5 is an example setup of an infrared lens alignment system and curing lights, according to an embodiment.

FIG. 5 is an example setup of an infrared lens alignment system and curing lights, according to an embodiment. The robotic arm 140 holds the lens 120 above the camera body 110, which contains an infrared image sensor (not shown). Multiple UV light sources 170, e.g., UV light emitting diodes (LEDs), can be distributed around the lens 120 to provide an even amount of light. The UV light produces a photochemical process which hardens certain resins that can be used as an adhesive for the lens 120. In an embodiment, four high-intensity spot curing LEDs operating on a 365 nm wavelength are used. In a further embodiment, other curing techniques may be used, such as visible light curing, lasers, halogen or tungsten lights, and the like.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; A and B in combination; B and C in combination; A and C in combination; or A, B, and C in combination.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

What is claimed is:

1. A system for optical alignment and calibration of an infrared camera lens, comprising:
 a lens support mechanism configured to adjust a position of the infrared camera lens relative to a camera body;
 at least one collimator configured to output infrared rays, wherein the at least one collimator is positioned such that the output infrared rays converge on an infrared sensor within the camera body through the infrared camera lens, wherein the at least one collimator includes a black body configured as a calibration target for the infrared camera lens; and
 a curing catalyst applier configured to apply a catalyst to cure an adhesive placed on the infrared camera lens;
 wherein the lens support mechanism is configured to initially adjust the position of the infrared camera lens until the infrared camera lens is positioned, using the output infrared rays, at an ideal lens position with respect to the infrared sensor;
 wherein the lens support mechanism is configured to adjust the position of the infrared camera lens after the infrared camera lens is positioned at an ideal lens position with respect to the infrared sensor to a new, offset position, the new, offset position of the infrared camera lens being based on the ideal lens position and expected shrinkage of the adhesive during curing; and
 wherein the curing catalyst applier applies the curing catalyst to cure the adhesive after the infrared camera lens is positioned at the new, offset position.

2. The system of claim 1, wherein the lens support mechanism further comprises:
 a robotic arm configured to manipulate the position of the infrared camera lens; and
 a hexapod platform configured to move the robotic arm in six degrees of freedom.

3. The system of claim 2, wherein the hexapod platform is a Steward platform having three pairs of actuators.

4. The system of claim 1, wherein the lens support mechanism is further configured to: adjust the position of the infrared camera lens based on a modulation transfer function (MTF) chart associated with the calibration target.

5. The system of claim 1, wherein the curing catalyst applier is an ultraviolet (UV) light source.

6. The system of claim 5, wherein the UV light source comprises multiple UV light sources placed evenly around the camera body.

7. The system of claim 1, wherein the curing catalyst applier includes at least one of: a visible light source, a source of temperature change, and a laser light source.

8. The system of claim 1, wherein the expected shrinkage of the adhesive during curing is a function of at least one property of the adhesive.

9. The system of claim 1, wherein the infrared camera lens moves to be substantially located at the ideal lens position as a result of actual shrinkage of the adhesive during curing.

10. The system of claim 8, wherein the actual shrinkage of the adhesive during curing is a function of at least one property of the adhesive.

11. A method for optical alignment and calibration of an infrared camera lens, comprising:
 applying an adhesive to an infrared camera lens, wherein the adhesive is configured to be cured by a curing catalyst;
 placing the infrared camera lens on a camera body using an adjustable arm;
 positioning the infrared camera lens at an ideal lens position using at least one collimator including a black body configured as a calibration target for the infrared camera lens and a modulation transfer function (MTF) chart associated thereto;
 moving the infrared camera lens to a new, offset position, the new, offset position of the infrared camera lens being determined based on the determined ideal lens position and expected shrinkage of the adhesive during curing; and
 curing the adhesive with the curing catalyst so as to fix the infrared camera lens in place, wherein the infrared camera lens moves from the new, offset position.

12. The method of claim 11, wherein the determining of the ideal lens position is based on optimizing resolution using the MTF chart.

13. The method of claim 11, wherein determining of the ideal lens position is based on optimizing contrast based on the MTF chart.

14. The method of claim 11, wherein the curing catalyst includes at least one of: an ultraviolet light source, a visible light source, a laser light source, a temperature change, and a curing chemical reaction.

15. The method of claim 11, wherein the expected shrinkage of the adhesive during curing is a function of at least one property of the adhesive.

16. The method of claim 11, wherein the infrared camera lens moves to be substantially located at the ideal lens position as a result of actual shrinkage of the adhesive during the curing.

17. The method of claim 16, wherein the actual shrinkage of the adhesive during curing is a function of at least one property of the adhesive.

18. The method of claim 11, wherein the curing process is started while the infrared camera lens is located at the new, offset position.

19. A method for optical alignment and calibration of an infrared camera lens, comprising:
 applying an adhesive to an infrared camera lens, wherein the adhesive is configured to be cured by a curing catalyst;
 placing the infrared camera lens on a camera body using an adjustable arm;
 positioning the infrared camera lens at an ideal lens position using at least one collimator including a black body configured as a calibration target for the infrared camera lens;
 moving the infrared camera lens to a new, offset position, the new, offset position of the infrared camera lens being determined based on the determined ideal lens position and expected shrinkage of the adhesive during curing; and
 curing the adhesive with the curing catalyst so as to fix the infrared camera lens in place, wherein the infrared camera lens moves from the new, offset position.

* * * * *